Figures 1, 2:
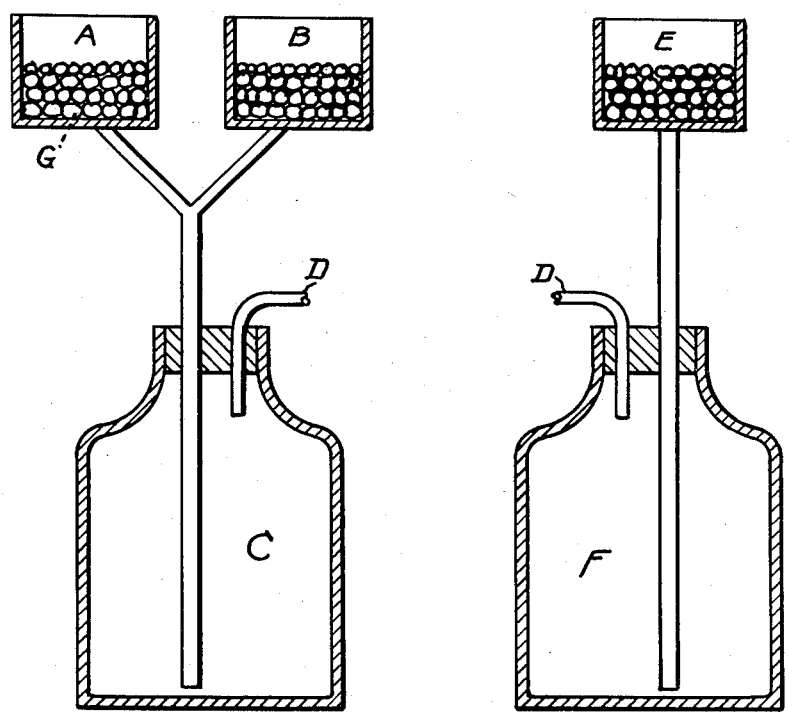

Jan. 24, 1956     C. A. VANA ET AL     2,732,290
FUSED VITREOUS COMPOSITIONS AS NUTRIENTS FOR PLANT GROWTH
Filed Oct. 31, 1955

INVENTORS
CHARLES A. VANA AND
BY GUIDO E. DIGERONIMO

Oberlin + Limbach
ATTORNEYS.

United States Patent Office 2,732,290
Patented Jan. 24, 1956

2,732,290

FUSED VITREOUS COMPOSITIONS AS NUTRIENTS FOR PLANT GROWTH

Charles A. Vana, Brecksville, and Guido E. Di Geronimo, Chagrin Falls, Ohio, assignors to Ferro Corporation, Cleveland, Ohio, a corporation Application October 31, 1955, Serial No. 543,928

7 Claims. (Cl. 71—1)

The present invention is a continuation-in-part of Ser. No. 469,284 dated November 16, 1954, now abandoned, which was in turn a continuation-in-part of Ser. No. 322,082 dated November 22, 1952, now abandoned, which was in turn a continuation-in-part of Ser. No. 134,952 dated December 24, 1949, now abandoned.

This invention relates as indicated to novel vitreous compositions adapted to serve as a source of nutrients for plant growth.

The importance of minor elements in plant nutrition is well known to those skilled in the art of plant physiology. It has been demonstrated by many workers skilled in the art of plant physiology that the minor elements, iron, manganese, copper, boron, zinc, cobalt and molybdenum are all important and essential to the proper physiological functioning of plants, thus it becomes apparent why it is necessary to obtain a condition whereby plants during their growth can obtain sufficient usable amounts of these minor elements. For example, the elements iron and manganese are common in soil and since they are needed by plants in minute quantities, it would be assumed that they are present in soils in adequate amounts for plant growth, however, in spite of soil containing sufficient amounts of iron and manganese, deficiencies of these elements occur in plants due to chemical and physiological processes which render them unavailable to the plants or make them inactive in the physiological functions within the plant.

An example of a disturbance in the iron nutrition of plants is the so-called lime induced chlorosis. Lime induced chlorosis has been thought to be due to a high calcium carbonate content of the soil which will raise the pH value of the soil to such an extent that iron is precipitated and made unavailable to the plants. Although lime induced chlorosis no doubt is the most important cause of iron deficiency, other causes are also of importance under certain conditions. It has also been demonstrated in solution cultures that at a neutral or alkaline reaction, an interrelationship between phosphorus and iron exists which results in iron deficiency.

While iron chlorosis may be due to a number of factors, the occurrence of manganese deficiencies is mainly due to oxidation and precipitation of the manganese in the soil, the oxidized form made unavailable to the plants. It is now generally accepted that manganese deficiencies may occur when the soil was limed above pH 6.5 and when the soil has strong oxidizing tendencies.

The importance of minor element deficiencies lies in the difficulty with which they are controlled. Soil treatments with salts of the minor elements are generally unsatisfactory and of limited application, since the conditions in the soil causing the original deficiencies still exist.

To avoid the influence of the disturbing soil factors, resort has been made to spraying or injection of the salts of the minor elements. The latter of the two methods can be applied only to trees and while generally effective on some trees may give rise to gumming of stone fruits, besides being tedious to carry out. Sprays are cumbersome and sometimes unsatisfactory since they are often damaging at effective concentrations.

Those skilled in the art have long sought a material which when incorporated in the soil would supply a sufficient amount of available minor elements to growing plants. The material should ideally have the following properties. (1) The solubility in water should be relatively small in order to prevent the elements from leaching, and also to prevent them from being rendered unavailable to the plants through chemical reactions in the soil. However, it is of the utmost importance to note that while the solubility of the materials is necessarily small, the rate of release of the nutrients from the material should be adequate for plant growth but must not attain the toxic magnitude. (2) The material should be non-toxic to plants in high concentrations so that large amounts could be applied at once to furnish an ample supply of the nutrient over a long period.

It is, therefore, the principal object of this invention to provide an artificially prepared physical complex for supplying the minor elements necessary for proper plant growth.

A further object of this invention is to provide a material in which the plant nutrients are chemically combined in a synthetic amorphous vitreous matrix and which matrix slowly and steadily releases the nutrients to the growing plants.

Other objects will become apparent as the invention proceeds.

To the accomplishment of the foregoing and related ends, the invention then, comprises the features hereinafter fully described and particularly pointed out in the claims the following description and the annexed drawings setting forth in detail certain illustrative embodiments of the invention, these being indicative, however, of but a few of the ways in which the principle of the invention may be employed.

Broadly stated, this invention comprises a composition of matter compatible with and capable of supplying nutrients to growing plants, comprising a substantially amorphous fused synthetic vitreous mass made by fusion and fritting, consisting essentially of 50 per cent to 98 per cent matrix and chemically combined therewith from 2 per cent to 50 per cent of at least one of the following minor elements, iron, manganese, copper, zinc, boron, cobalt and molybdenum, said entire vitreous mass comprising 26 per cent to 85 per cent $SiO_2$ and said vitreous mass having a minor element extraction value of 50 parts per million to 7500 parts per million when extracted by the ammonium acetate extraction test as herein disclosed.

It is of extreme importance at this point to note that the present invention fully intends to exclude the various vitreous compositions well known as porcelain enamels and glazes, as for example, as disclosed in Patent No. 2,347,187. Those skilled in the art of porcelain enamel will readily recognize that those vitreous compositions known as porcelain enamels and glazes contain ingredients which make them substantially insoluble, thus making them unable to possibly release the required amounts of minor elements which they might incidentally contain.

The present invention is concerned only with those compositions which will release minor elements, recognized to be essential for or beneficial to plant growth, at a controlled rate as measured by the extraction procedure herein described.

Certain elements which usually form an essential part of porcelain enamels and glazes are not recognized by those skilled in the agricultural arts as being either essential for or beneficial to plant growth, namely such elements as titanium, zirconium, lead, arsenic, antimony and tin. Thus it is entirely within the contemplation of this invention to specifically exclude from the claimed compositions materials such as aforementioned.

Throughout the following specification and appended claims, the vitreous compositions of the present invention are referred to as being slowly soluble and having an extraction value of from 50 parts per million to 7500 parts per million when extracted by the ammonium acetate extraction test. The ammonium acetate extraction test as used herein is defined as follows:

A. EXTRACTION SOLUTION

1. Place 25 ml. glacial acetic acid in a litter graduate and make up to 980 ml. with distilled water. Mix, pour into a beaker, add concentrated ammonium hydroxide to exactly pH 5.0, transfer to a 1 liter volumetric flask, dilute to the mark and again mix. Preserve in stoppered bottle, test for pH before using.

B. PREPARATION OF SAMPLE

1. Screen a suitable size sample, about 100 gm., for 15 minutes on a rotap, collecting the material which passes the 200 mesh screen and remains on the 325 mesh. Wash this fraction on the 325 mesh screen thoroughly to remove "fines" and finally with distilled water to remove impurities from the tap water.
2. Dry at 105° C. for one hour.

C. PROCEDURE

1. Weigh 5.000 gm. of the sample prepared in B above into a 1 liter Erlenmeyer flask. Add exactly 250 ml. of extraction solution, A above, close the flask with a vented stopper and agitate continuously on a shaking machine for 16 hours at room temperature (70° to 75°).
2. Prepare a tight, ½" filter paper plug, for use with strong suction. Wash throughly with distilled water and allow to suck dry. Pour 25 ml. of the extract through the plug and discard. Again pour 25 ml. of the extract through the plug and discard. Drain out the filter flask (do not wash), assemble the filter and pour the remaining 200 ml. of extract through the plug. The filtrate should be perfectly clear.
3. Determine the concentration of each of the minor elements, iron, manganese, copper, zinc, boron, cobalt, molybdenum in the filtrate in parts per million by any standard method and add the results. The final figure is total minor element concentration in parts per million, hereinafter called "extraction value."

It will be understood that the term "extraction value," limits for which are the criteria herein, refers to the values obtained by the particular value given above and by no other method.

It is important to note here that while the following experimental data has been obtained by growing plants utilizing sub-irrigation methods, it is entirely within the contemplation of this invention to utilize the vitreous nutrient compositions disclosed herein for use in normal soil culture. The vitreous compositions of this invention have been used in soil for growing plants in various parts of the entire country. However, for the sake of experimental accuracy, only that data from the sub-irrigation methods are presented.

At the present time there are three general methods of plant production with nutrient solutions, collectively termed "nutriculture." These are (1) sand culture, (2) water culture, also called hydroponics, and (3) sub-irrigation culture, also called gravel culture.

In sand culture seeds are dispersed in fine sand and subsequently watered with a nutrient solution applied to the surface of the sand. In the water culture method the plants are grown with their roots suspended in a nutrient solution. The plants must be supported above the water by various means and the solution must be areated in order to supply sufficient oxygen to the roots. Control of the composition of the nutrient solution is also very exacting.

In the sub-irrigation method of culture, the seeds are dispersed in gravel or other suitable inert materials and are repeatedly irrigated from the bottom up.

A. VITREOUS NUTRIENT COMPOSITIONS OF THE PRESENT INVENTION

In the aforegoing broadly stated paragraph it was stated that the amorphous synthetic vitreous mass of the present composition was made by fushion and fritting. This is an important characteristics of the compositions of the present invention and will herein be more clearly defined.

The raw materials for the vitreous compositions of the present invention are thoroughly mixed and then smelted in a high temperature smelter at about 1800° to 2800° F. We prefer a smelting temperature of about 2200° F. to 2400° F. When the entire mass becomes fluid the molten material is then fritted. It is to be understood that smelting means the entire mass is reduced to a fluid molten condition as distinct from a sintered condition. Fritting is a well known operation in the manufacture of porcelain enamels and defines a quenching operation. When the fused vitreous mass is quenched, it is shattered because of the strains set up in the vitreous mass. This fritting may be accomplished as by running the molten material into water or by running the molten material between steel rolls. Not only is the vitreous mass broken into small pieces, but each piece is intersected with cracks. Thus it will be readily seen that the fritting operation imparts to the material a visible condition favoring disintegration. This physical condition favoring disintegration may be caused by any of the well known methods of fritting, such as fritting in water, fritting in air or fritting between steel rolls. However, it is to be emphasized that regardless of what means are used to frit, the fusion and fritting is an important operation in the manufacture of the compositions of the present invention and are a necessary component in producing compositions having the desired extraction value.

The second important portion of the broadly stated paragraph states that the vitreous mass consists essentially of 50 per cent to 98 per cent matrix and from 2 per cent to 50 per cent of at least one of the minor elements iron, manganese, copper, zinc, boron, cobalt and molybdenum. If more than one minor element is present then the sum total of all such minor elements will be present in the amount of from 2%–50%. These proportions are also extremely critical because we have found that in order to produce a satisfactory nutrient composition, it is necessary to have chemically combined in the vitreous mass no less than 2 per cent and no more than 50 per cent total trace element content. We have found that at the lower limit of total trace element content the present nutrient compositions are effective and at the upper percentage of total trace element content the nutrient compositions are not injurious. The usual rate of soil application being from 10–200 lbs. per acre varying inversely with the total minor element content. The glassy matrix of the vitreous compositions of this invention is composed of those materials other than the aforementioned minor elements. Such ingredients as $SiO_2$, $CaO$, $K_2O$, $MgO$, $Na_2O$ and $P_2O_5$ are materials which are considered as the matrix portion. These matrix materials when admixed with the minor elements and smelted and fritted produce a vitreous mass which contains the minor elements chemically combined therein. We also wish to emphasize that in order to produce nutrient compositions having the desired extraction value of from 50 parts per million to 7500 parts per million when extracted by the aforegoing ammonium acetate extraction test it is necessary that the entire vitreous mass contain from about 26 per cent to about 85 per cent $SiO_2$. The following are examples which are illustrative of the above discussed nutrient compositions.

Therefore, it will be seen that the compositions of the present invention are a separate and distinct class of glassy materials whose only value lie in their ability to supply nutrients to growing plants.

C. NUTRIENT SOLUTIONS

The nutrient solution of Shive ("a three salt solution for plants" Am. Jour. Bot. 2:157–160, 1915) was used as the solution for flooding pots A, B and E. Its composition is as follows:

II

| Salt: | Gms. per liter |
|---|---|
| $MgSO_4 7H_2O$ | 3.697 |
| $Ca(NO_3)_2 4H_2O$ | 1.228 |
| $KH_2PO_4$ | 2.450 |

Concentrated stock solutions of each of the nutrient salts were made up to have the following concentrations.

III

| Salt: | Gms. per 16 liters |
|---|---|
| $MgSO_4 7H_2O$ | 5502.0 |
| $Ca(NO_3)_2 4H_2O$ | 1827.3 |
| $KH_2PO_4$ | 3646.0 |

Each carboy C and F, containing 15 liters of water received 178 mls. of each of these stock solutions, and then water was added to bring the total volume to 16 liters.

Micro elements were supplied by adding 1 ml. of a stock solution per liter of nutrient solution. This stock solution of micro elements has the following composition.

IV

| Salt: | Gms. per 2 liters |
|---|---|
| $HBO_3$ | 5.720 |
| $ZnSO_4 7H_2O$ | 0.440 |
| $MoO_3$ | 0.015 |
| $CuSO_4$ | 0.160 |

The final nutrient solution contained the following concentrations of the micro elements:

V

| Element: | Parts per million |
|---|---|
| Boron | 0.50 |
| Zinc | 0.05 |
| Molybdenum | 0.05 |
| Copper | 0.02 |

To the culture solutions flooding the vitreous compositions containing iron but no manganese 16 milliliters of a stock solution containing 1.538 grams of $MnSO_4 H_2O$ per liter were added per carboy. The final concentration of manganese in the solution was about 0.5 part per million.

The "absolute control" cultures received 4 parts per million of iron and 0.5 part per million of manganese added to the above mentioned micro elements.

D. PLANTS STUDIED

Forty seeds of wheat variety "Illinois No. 16128" harvested in 1947 were used to study the effects of the minor elements supplied by vitreous compositions of the present invention.

E. EXPERIMENTAL OBSERVATIONS

Before reference is made to the detailed experimental observations of the present study we wish to point out that other so-called slowly soluble or insoluble nutrient materials are known to those skilled in the art of agronomy. Several of the prior art workers have attempted to supply nutrients (and particularly iron) by the use of such substances as glass wool, quartz sand and magnetite, pumice, dolomite and magnetite, etc.

In view of the prior art the following experiment was set up.

Soya beans were planted and grown in (a) glass wool, (b) quartz sand plus 0.1 per cent magnetite, (c) 50 per cent quartz sand plus 50 per cent pumice, (d) dolomite plus 0.1 per cent magnetite and (e) the compositions of the present invention. All of the various cultures were simultaneously grown under greenhouse conditions having substantially identical light, heat, humidity and pH conditions. All of the cultures were at planned intervals simultaneously fed an iron-free solution and the pH was maintained at 5.5. These cultures were kept at the same pH except the dolomite culture which automatically reverted to a pH of 8 or thereabouts because of the nature of dolomite.

So that all conditions would remain as constant as possible the terminal leaves of the various plants were all harvested at the same time. The terminal leaves were used since the newest leaves are the most sensitive to iron deficiency. When plants are deprived of iron the new stem and leaves that develop are chlorotic or almost pure white so that there is a marked and abrupt contrast between the green leaves and the colorless ones.

The results obtained dramatically showed the effect of the compositions of the present inventions. All the plants grown in A, B, C and D above were very badly chlorotic while the plants grown in E (composition of the present invention) were larger, stronger, and had a deep healthy green color.

The plants produced by the product of this invention were conspicuously better than the absolute controls, even though the control plants themselves were very fine. The leaves were broader, larger, firmer in texture and greener than those of the absolute controls. The thickness and firmness of the stems were especially noticeable.

The individual quartz control cultures produced plants whose leaves were narrower, less firm to the touch and distinctly chlorotic. These observations show that very little or possibly no iron was available through the solubility of the vitreous composition, of this invention, in the adjacent pot.

It is to be noted that if the plants grown on the vitreous composition of the present invention had not been available for the comparison, the absolute control plants would have been rated as entirely satisfactory. This is all the more significant when it is again pointed out that the absolute control plants themselves were exceptionally fine plants.

The individual quartz control cultures produced less fresh weight of plant growth than did the absolute controls and the leaves were definitely chlorotic.

The total fresh weights produced by the various cultures may be compared more easily if the weights are expressed as percentages of the absolute control value.

VI

| Culture: | Fresh weight |
|---|---|
| Absolute control | 100 |
| Vitreous composition of this invention "A" | 132 |
| Vitreous composition of this invention "B" | 142 |
| Individual quartz control "A" | 92 |
| Individual quartz control "B" | 82 |

The above data show that the plants grown on the vitreous compositions A and B of this invention produced plants having 32 and 42 per cent more fresh weight than did the absolute control cultures.

VII

| Culture: | Fresh weight |
|---|---|
| Absolute control | 100 |
| Vitreous composition of this invention "C" | 149 |
| Vitreous composition of this invention "D" | 143 |
| Individual quartz control "C" | 96 |
| Individual quartz control "D" | 108 |

The above data show that the plants grown on the vitreous compositions C and D of this invention produced plants having 49 and 43 per cent more fresh weight than did the absolute control cultures.

The total dry weight of the plants grown on the vitreous compositions was also conspicuously greater than that

| A | B | C | D |
|---|---|---|---|
| 37.0% SiO$_2$ | 57.61% SiO$_2$ | 26.94% SiO$_2$ | 37.41% SiO$_2$ |
| 17.3% P$_2$O$_5$ | 1.96% CaO | 7.0% CaO | 13.2% Na$_2$O |
| 15.1% CaO | 1.37% MgO | 3.9% MgO | 2.22% K$_2$O |
| 1.6% MgO | 7.74% K$_2$O | 7.75% K$_2$O | 3.99% Al$_2$O$_3$ |
| 3.6% CaF | 4.68% Na$_2$O | 7.75% Na$_2$O | 1.75% CaO |
| 21.0% K$_2$O | 11.0% Fe$_2$O$_3$ | 17.6% P$_2$O$_5$ | 6.14% Fe$_2$O$_3$ |
| 4.3% Fe$_2$O$_3$ | 4.4% MnO$_2$ | 11.0% Fe$_2$O$_3$ | 16.95% MnO$_2$ |
| 0.2% MnO$_2$ | 4.4% CuO | 4.4% MnO$_2$ | 5.47% MgO |
| 0.17% B$_2$O$_3$ | 4.4% ZnO | 4.4% CuO | 2.75% CuO |
| 0.08% ZnO | 2.2% B$_2$O$_3$ | 4.4% ZnO | 9.9% B$_2$O$_3$ |
| 0.06% CuO | 0.22% MoO$_3$ | 4.4% B$_2$O$_3$ | 0.22% MoO$_3$ |
| 0.005% CoO | | 0.22% MoO$_3$ | |
| 0.005% MoO$_3$ | | 0.22% CoO | |

It will be noted that if cobalt and/or molybdenum are used in the compositions of this invention the amount of cobalt and/or molybdenum present will always be less than one-tenth of the amount of any of the elements manganese, zinc, copper and boron.

Attention is directed to the fact that while the foregoing examples are considered as complete type fertilizers, nitrogen is absent in the formulations. Since these various substances are melted at high temperatures, therefore, for all practical purposes it would be impossible to retain nitrogen in the vitreous mass. However, if desired, the slowly soluble vitreous mass of the present invention can be readily admixed with a slowly soluble nitrogen bearing material such as urea formaldehyde. Thus the materials of the present invention after smelting and fritting can be admixed with urea formaldehyde or other similar nitrogen releasing materials and a complete fertilizer containing both the major and minor elements is thus formed.

We have found that when these above discussed vitreous nutrient compositions are used in soil for growing plants, the material should be applied in a comminuted state. The material should have a maximum particle size of 90 per cent through a 20 U. S. standard mesh screen to a minimum particle size of 90 per cent through a 200 U. S. standard mesh screen. We have found that in the preferred embodiment of our invention, when the vitreous compositions are ground to a fineness of 90 per cent through a 100 mesh screen the best conditions we had.

Thus, in summary, it will be readily seen that we have herein defined a material which must have a solubility of from 50 parts per million to 7500 parts per million when extracted by the aforegoing ammonium acetate extraction test. In order to obtain this characteristic solubility, the material must be a synthetic substantially amorphous vitreous mass, it must be produced by fusion and fritting and it must consist essentially of 50 per cent to 98 per cent matrix and from 2 per cent to 50 per cent of at least one of the following minor elements, iron, manganese, copper, zinc, boron, cobalt and molybdenum and the entire glassy or vitreous mass must comprise 26 per cent to 85 per cent SiO$_2$.

In addition to supplying the minor elements we have found that the matrix of our composition exerts an influence on the absorption of nitrogen and phosphorus and on the formation of ascorbic acid in plants. As to why this happens is not definitely known, however, the fact remains as will be shown in the following experimental data, that this phenomenon does take place and heretofore has never occurred with current nutricultural practices.

As previously stated, from 26 per cent to 85 per cent of the entire vitreous mass is comprised of the matrix component SiO$_2$. Besides the SiO$_2$ we prefer a matrix comprising 1 per cent to 10 per cent CaO, 1 per cent to 15 per cent K$_2$O, 1 per cent to 5 per cent MgO and 1 per cent to 20 per cent Na$_2$O.

Since the problem of supplying iron and manganese is extremely important and since it was necessary to prove that growing plants could obtain the minor elements from the slowly soluble vitreous compositions of the present invention, the following experimental procedure was followed.

B. EXPERIMENTAL PROCEDURE

Referring now to the annexed drawing, Figures 1 and 2 are diagrammatic views of the culture pots used for growing plants. Culture pots A, B and E are one gallon glazed earthenware containers. A hole, G, ¾ of an inch in diameter is located on the bottom of the wall of the pots which permits the nutrient solution in carboys, C and F, to flood the pots, A, B and E. The carboys C and F contain 16 liters of nutrient solution. At 4 hour intervals, a time clock, not shown here, turns on an electrically driven air pump, not shown here, which forces air from a common line, D, into the carboys, C, and F, and thereby forces the solutions upwards, flooding the culture pots A, B and E simultaneously. A hydrostatic pressure column, not shown here, connected to the common air line, D, regulated the height to which the liquid rises in the culture pots.

Pot A contains the vitreous nutrient composition of this invention. Pot B contains quartz gravel and is used as the individual control. Both pots, A and B are flooded by the same solution. Pot E contains quartz gravel and is the absolute control. The absolute control is flooded by a separate nutrient solution. Particle size of the vitreous composition of this invention and the quartz gravel are about ⅛ inch in size. The nutrient solution used to flood pots A and B is complete with the exception that it lacks iron and manganese.

The nutrient solution for the absolute control cultures contain the proper amounts of iron-manganese in the solution in order that normal growth could be obtained as a standard for the comparison for the growth supporting quality of the vitreous nutrient composition of the present invention.

The following examples serve to illustrate the types of compositions which were used to obtain the experimental data.

| A | B | C | D |
|---|---|---|---|
| 69.8% SiO$_2$ | 74.8% SiO$_2$ | 40.0% SiO$_2$ | 57.5% SiO$_2$ |
| 5.0% Fe$_2$O$_3$ | 5.0% Fe$_2$O$_3$ | 5.0% Fe$_2$O$_3$ | 5.0% Fe$_2$O$_3$ |
| 5.8% CaO | 2.5% CaO | 1.0% MnO$_2$ | 1.0% MnO$_2$ |
| 3.8% MgO | 1.7% MgO | 8.5% CaO | 5.8% CaO |
| 7.8% K$_2$O | 10.0% K$_2$O | 4.7% MgO | 3.2% MgO |
| 6.0% Na$_2$O | 6.0% Na$_2$O | 9.5% K$_2$O | 6.6% K$_2$O |
| | | 9.5% Na$_2$O | 6.6% Na$_2$O |
| | | 21.6% P$_2$O$_5$ | 14.8% P$_2$O$_5$ |

In each of the above formulations, all the identified components other than the iron and manganese participate in the formation of the amorphous vitreous matrix from which matrix iron and/or manganese are made available in slowly soluble form.

From a casual observation it would appear that the foregoing examples of compositions of the present invention are similar to porcelain enamel formulations. However, it is of the utmost importance to note that those skilled in the art would readily recognize the compositions disclosed herein would be entirely unsuitable in that they would lack proper coefficient of expansion properties, adherence properties, fusibility properties and color properties. Further, it will be noted that iron is one of the minor elements used in the present compositions. In the manufacture of porcelain enamel it is absolutely necessary to keep iron out of the formulations. Even amounts as low as 0.5 per cent iron is detrimental to porcelain enamels. Iron contamination in amounts in excess of 0.5 per cent porcelain enamels inhibits the bond properties, causes and/or increases such enameling defects as boiling, blistering, fishscaling and copperheading. In addition iron in trace amounts adversely affects the finish and color of porcelain enamel. Even in special cases where black cover coats are formulated, iron is not used in amounts in excess of 0.5 per cent of the total batch weight.

obtained from the absolute control culture. The following data are also expressed as percentages of the absolute control value.

VIII

Culture: Dried weight
- Absolute control _____ 100
- Vitreous composition of this invention "C" ____ 143
- Vitreous composition of this invention "D" ____ 143
- Individual quartz control "C" _____ 88
- Individual quartz control "D" _____ 111

The above data show that the plants grown on the vitreous compositions C and D of this invention produced plants having 43 per cent more dry weight than did the absolute control.

IX

Total iron absorbed, in milligrams per 10 plants, by plants grown on the vitreous compositions of the present invention individual quartz control and absolute control cultures supplied with a complete nutrient solution.

Milligrams of iron
- Absolute control _____ 0.42
- Individual quartz control _____ 0.50
- Compositions of present invention _____ 0.77

X

Total manganese absorbed, in milligrams per 10 plants by plants grown on the vitreous compositions of the present invention, individual quartz control and absolute control cultures supplied with a complete nutrient solution.

Milligrams of manganese
- Absolute control _____ 0.42
- Individual quartz control _____ 0.36
- Compositions of present invention _____ 0.49

From the data disclosed in Tables IX and X it will be readily seen that while the compositions of the present invention are vitreous and very slowly soluble they supply the minor elements to growing plants more readily than nutrient solutions.

If the total fresh weights of the plants, total dry weight and total iron absorbed per culture are expressed in descending order the following data are obtained.

XI

|  | Total Fresh Weight | Total Dry Weight | Total Iron Weight |
|---|---|---|---|
| Vitreous compositions of this invention "C" | 1 | 1 | 1 |
| Vitreous composition of this invention "D" | 2 | 2 | 2 |
| Vitreous composition of this invention "B" | 3 | 3 | 3 |
| Vitreous composition of this invention "A" | 4 | 4 | 4 |
| Absolute control | 5 | 5 | 5 |

These above data indicate that the fresh and dry weights are determined by the total amount of iron absorbed.

Although the vitreous compositions A and B of this invention contain no $P_2O_5$ the plants grown on these vitreous nutrient compositions absorbed more phosphorous than the plants grown on the corresponding quartz controls, even though both cultures were supplied from the same nutrient solution.

If the total phosphorous absorbed per culture is calculated as percentages of the control value, the relationship appears as presented in the following table.

XII

Phosphorous absorbed
- Absolute control _____ 100
- Vitreous composition of this invention "A" __ 100
- Vitreous composition of this invention "B" __ 100
- Individual quartz control "A" _____ 95
- Individual quartz control "B" _____ 91

Since all the above cultures were supplied with the same amount of phosphorous and since the vitreous nutrient compositions contained no phosphorous, it follows that the differences in the total amount of phosphorous absorbed per culture necessarily must be related either to the amount of plant growth produced, or to the effect of some component of the vitreous composition, such as iron. It is to be noted that plants grown on the vitreous composition did not show a greater amount of phosphorous absorbed than the absolute control. This is explained by the conspicuously greater amount of dry matter produced by plants grown on these vitreous compositions, which would lessen the percentage of phosphorous by simple dilution by the large amount of dry matter.

Compositions A and B which did not contain $P_2O_5$ did influence phosphorous absorption in growing plants. It is important to note here that compositions such as disclosed by Formulae C and D, which did contain $P_2O_5$, grew plants which contained more phosphorous than did their individual quartz control or the absolute control. Thus again showing that the very slowly soluble vitreous compositions of the present invention supply nutrients more readily than nutrient solutions.

The data showing the total absorption of nitrogen by the cultures are presented in Table XIII. The amount of nitrogen absorbed by the plants grown on the vitreous nutrient of this invention was considerably greater than that absorbed by the absolute control plants. The individual quartz controls absorbed even less total nitrogen than did the absolute control plants, although the amounts of nitrogen in the nutrient solution were identical. These data show that nitrogen absorption was greater in the healthiest, fastest growing plants.

XIII

Total nitrogen absorbed per culture, expressed as grams.

Grams nitrogen absorbed
- Vitreous composition of this invention "A" _____ 0.537
- Vitreous composition of this invention "B" _____ 0.587
- Absolute control _____ 0.447
- Individual quartz control "A" _____ 0.379
- Individual quartz control "B" _____ 0.339

XIV

Total nitrogen absorbed per culture expressed as percentages of the absolute control value.

- Absolute control _____ 100
- Vitreous composition of this invention "A" _____ 120
- Vitreous composition of this invention "B" _____ 131
- Individual quartz control "A" _____ 85
- Individual quartz control "B" _____ 76

The data in Table XV show that the percentages of nitrogen in the dry matter were greater in the plants grown on the vitreous compositions of this invention than in those grown on their corresponding quartz controls and also in the absolute control culture.

XV

Percentage of nitrogen in the dry matter:

- Vitreous composition of this invention "A" _____ 4.44
- Vitreous composition of this invention "B" _____ 4.68
- Absolute control _____ 4.39
- Individual quartz control "A" _____ 4.40
- Individual quartz control "B" _____ 4.46

These data are of especial interest since they show that the greater absorption of nitrogen by the plants grown on the vitreous nutrient compositions was not due to merely the greater size of the plants but was due to some component released by the vitreous composition. The fact that the plants grown on the corresponding quartz controls contained a higher percentage of nitrogen than those produced by the absolute control cultures indicates that the component of the vitreous nutrient composition favoring nitrogen absorption was more or less soluble.

The vitreous compositions of this invention produced plants containing conspicuously more ascorbic acid per culture than did the absolute controls or the individual quartz controls.

The data in the following table, XVI, are calculated as percentages of the absolute control value.

XVI

| | |
|---|---|
| Absolute control | 100 |
| Vitreous composition of this invention "A" | 119 |
| Vitreous composition of this invention "B" | 143 |
| Individual quartz control "A" | 83 |
| Individual quartz control "B" | 70 |

Concentrations of ascorbic acid were calculated on the dry matter basis from the amount found in the fresh material and from the percentage of dry matter. The concentration of this vitamin is greater for the vitreous composition produced plants than in the absolute controls or the individual quartz controls.

XVII

Concentration of ascorbic acid in dry matter, expressed as percentages of absolute control value.

| | |
|---|---|
| Vitreous composition of this invention "A" | 101 |
| Vitreous composition of this invention "B" | 117 |
| Absolute control | 100 |
| Individual quartz control "A" | 96 |
| Individual quartz control "B" | 93 |

These data are conclusive evidence that the vitreous nutrient composition of this invention exerted a favorable influence on the accumulation of ascorbic acid in the plants.

From the foregoing discussion it can be readily seen that we have provided a very slowly soluble vitreous composition which supplied nutrients and which produced larger and better plants.

Other modes of applying the principle of the invention may be employed provided the features stated in any of the following claims or the equivalent of such be employed.

We, therefore, particularly point out and distinctly claim as our invention:

1. A composition of matter compatible with and capable of supplying nutrients to growing plants, comprising a substantially amorphous fused synthetic vitreous mass comprising a matrix having chemically combined therewith at least one minor element necessary for proper plant growth, said vitreous mass made by fusion and fritting, consisting of 50 per cent to 98 per cent matrix and chemically combined therewith from 2 per cent to 50 per cent of at least one of the following minor elements iron, manganese, copper, zinc, boron, cobalt and molybdenum, said entire vitreous mass comprising 26 per cent to 85 per cent $SiO_2$ and said vitreous mass having a minor element extraction value of 50 parts per million to 7500 parts per million when extracted by the ammonium acetate extraction test as herein disclosed.

2. A composition of matter compatible with and capable of supplying nutrients to growing plants, comprising a substantially amorphous fused synthetic vitreous mass comprising a matrix having chemically combined therewith at least one minor element necessary for proper plant growth, said vitreous mass made by fusion and fritting, consisting of 50 per cent to 98 per cent matrix and chemically combined therewith from 2 per cent to 50 per cent of at least one of the following minor elements iron, manganese, copper, zinc, boron, cobalt and molybdenum, said entire vitreous mass comprising 26 per cent to 85 per cent $SiO_2$, said vitreous mass having a minor element extraction value of 50 parts per million to 7500 parts per million when extracted by the ammonium acetate extraction test herein disclosed and said vitreous mass having a particle size of from 90 per cent through a 20 U. S. standard mesh sieve to 90 per cent through a 200 U. S. standard mesh sieve.

3. The method of producing a composition of matter compatible with and capable of supplying nutrients to growing plants and which composition has a minor element extraction value of from 50 parts per million to 7500 parts per million when extracted by the ammonium acetate extraction test disclosed herein, which comprises admixing from 26 per cent to 85 per cent $SiO_2$, 1 per cent to 10 per cent CaO, 1 per cent to 15 per cent $K_2O$, 1 per cent to 5 per cent MgO, 1 per cent to 20 per cent $Na_2O$ and from 2 per cent to 50 per cent of at least one of the following minor elements iron, manganese, copper, zinc, boron, cobalt and molybdenum, heating said admixture in a smelter at from 1800° F. to 2800° F. until fused and then fritting said fused mass.

4. The method of producing a composition of matter compatible with and capable of supplying nutrients to growing plants and which composition has a minor element extraction value of from 50 parts per million to 7500 parts per million when extracted by the ammonium acetate extraction test disclosed herein, which comprises admixing from 26 per cent to 85 per cent $SiO_2$, 1 per cent to 10 per cent CaO, 1 per cent to 15 per cent $K_2O$, 1 per cent to 5 per cent MgO, 1 per cent to 20 per cent $Na_2O$ and from 2 per cent to 50 per cent of at least one of the following minor elements iron, manganese, copper, zinc, boron, cobalt and molybdenum, heating said admixture in a smelter at from 1800° F. to 2800° F. until fused, fritting said fused mass and then comminuting said fritted mass until the particle size of said mass is from 90 per cent through a 20 U. S. standard mesh sieve to 90 per cent through a 200 U. S. standard mesh sieve.

5. The method of supplying the minor elements essential to growing plants which comprises adding to the media supporting said growing plants a substantially amorphous fused synthetic vitreous mass as defined in claim 2.

6. A composition in accordance with claim 1, characterized further in that said fused synthetic vitreous matrix contains in combined form substantial amounts of compounds of potassium and phosphorus.

7. A composition of matter comprising an admixture of a substantial amount of a fused synthetic vitreous mass as defined in claim 1 and a substantial amount of urea formaldehyde.

References Cited in the file of this patent

UNITED STATES PATENTS

| | | |
|---|---|---|
| 959,841 | Carpenter | May 31, 1910 |
| 1,016,352 | Meriwether | Feb. 6, 1912 |
| 1,460,888 | Cook | July 3, 1923 |
| 2,192,939 | Slayter et al. | Mar. 12, 1940 |
| 2,347,187 | Frost | Apr. 25, 1944 |
| 2,498,912 | Claudet | Feb. 28, 1950 |